Nov. 3, 1936.   I. L. EASTMAN   2,059,446
OIL GUN STRUCTURE
Original Filed Jan. 23, 1933
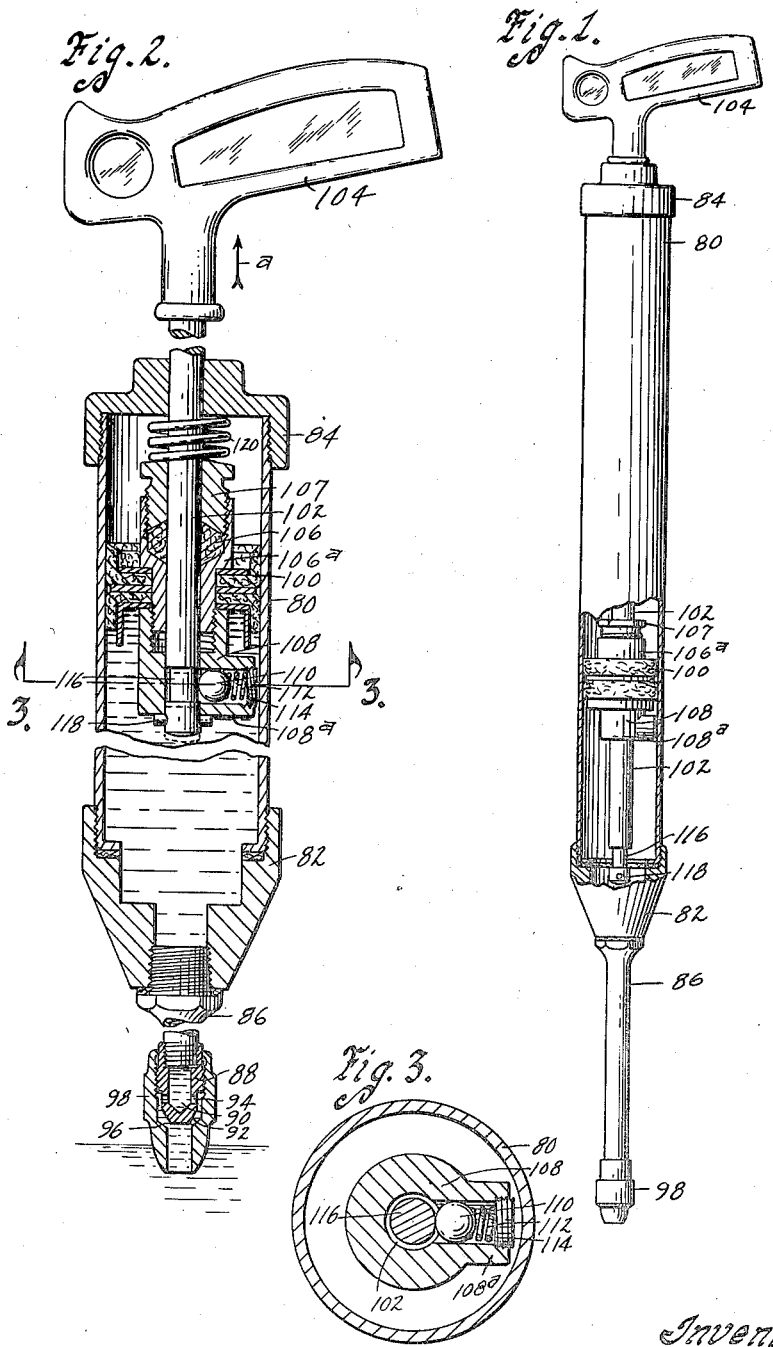

Patented Nov. 3, 1936

2,059,446

UNITED STATES PATENT OFFICE 2,059,446

OIL GUN STRUCTURE

Ivan L. Eastman, Toledo, Ohio, assignor to The Aro Equipment Corporation, Bryan, Ohio, a corporation of Ohio Original application January 23, 1933, Serial No. 653,115. Divided and this application June 25, 1934, Serial No. 732,290

4 Claims. (Cl. 221—47.4)

An object of my present invention is to provide an oil gun structure having simple, durable and inexpensive mechanism for placing the contents thereof under pressure to force the oil from the reservoir of the gun into a discharge nozzle or the like.

My present application is a division from my copending application Serial No. 653,115, filed January 23, 1933.

A further object is to provide an oil gun construction having a piston for filling the gun with oil and for expelling oil therefrom, a rod being provided for operating the piston.

Still another object is to provide clutch means for connecting the piston to the rod, operable during the oil expelling operation to cause such connection and operable to be disconnected when it is desired to push the rod into the oil gun without expelling oil.

A further object is to provide an oil gun of the character mentioned with a shut-off nozzle which can be closed when the gun is not in use.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation, partly in section, of an oil gun embodying my invention.

Figure 2 is an enlarged sectional view of the same showing the parts in a different position; and Figure 3 is a sectional view on the line 3—3 of Figure 2.

My oil gun comprises a cylinder 80 having heads 82 and 84 thereon. A discharge pipe 86 is connected with the head 82 and terminates in a fitting 88, which together with a fitting 98 constitute a shut-off nozzle. The fitting 88 has a bore 90 and terminates in a valve plug 92. Openings 94 are provided for the flow of oil to and from the bore 90 and past the valve plug 92.

The valve plug 92 is adapted to seat against a seat 96 of the fitting 98, a screw-threaded connection being provided between the two for adjusting the plug 92 relative to the seat 96.

Within the cylinder 80, a piston 100 is reciprocable. For reciprocating it, I provide a rod 102 terminating in a handle 104. The rod is reciprocable relative to the piston 100 and is packed relative thereto by packing 106 in a fitting 106a. A packing nut 107 is provided for the packing 106.

A fitting 108 is screw-threadedly connected with the fitting 106a and the fitting 108 together with a shoulder on the fitting 106a provide means for retaining cup leathers of the piston 100 in position.

Within the fitting 108, I provide a plunger such as a ball 110 which is backed by a spring 112. A plug 114 retains the spring in position.

The ball 110 is adapted to coact with either the surface of the rod 102 or an annular depression 116 therein. A stop pin 118 is provided in the lower end of the rod 102.

Practical operation

In the operation of the oil gun, the nozzle at the lower end of the gun can be adjusted to open position, as shown in Figure 2 and immersed in oil when it is desired to refill the cylinder 80. The handle 104 is then pulled upwardly in the direction of the arrow $a$ until the stop pin 118 engages the fitting 108. Thereafter further upward movement of the handle 104 will raise the piston 100 for drawing oil into the cylinder. A spring 120 is provided to prevent damage to either the nut 107 or the head 84 when the piston is pulled to its upper limit of movement.

After the gun is filled, the nozzle fitting 98 can be screwed onto the fitting 88 to prevent any accidental discharge of oil. When it is desired to dispense oil, the nozzle may be opened and the handle 104 pushed downwardly whereupon the rod 102 will first assume the dotted line position indicated at its lower end with the upper shoulder of the depression 116 engaging the ball 110 and thereafter the piston 100 will be pushed downwardly. This dispenses the oil from the nozzle 98 for filling a crank case, for instance, or any other piece of machinery needing oil.

After the required amount of oil has been dispensed, the nozzle 98 can be closed and then by striking the handle 104 a sharp blow, the ball 110 may be pushed out of the depression 116 and the rod 102 can be pushed all the way into the cylinder 80, as shown in Figure 1, so that the handle 104 does not project to an awkward position. Thus oil may be dispensed by operating the handle 104 and yet the piston can be left in any position to which it is pushed with the handle 104 being moved to position adjacent the head 84.

Although I have shown by way of specific example a piston rod having a depression and a spring pressed ball carried by the piston itself, other frictional or slip connections can be substituted without departing from the real spirit and purpose of my invention, and it is my intention to cover by my claims, any modified forms of structure or use of mechanical equivalents, which may be reasonably included within their scope.

I claim as my invention:

1. In an oil gun structure, an oil cylinder, a piston reciprocable therein, an operating rod for said piston, said operating rod having a depression therein and being slidable relative to said piston and clutch means for connecting said piston with said rod whereby to reciprocate the piston by sliding the rod, said clutch means comprising a spring pressed ball seating in said depression when said depression registers with said ball.

2. In an oil gun structure, an oil cylinder, a piston reciprocable therein, an operating rod for said piston, said operating rod being slidable relative to said piston and means operable to connect said piston to one part of said rod and to retain such connection for the purpose of moving the piston by sliding the rod except upon a predetermined force being exerted on said rod to move it relative to said piston, said means comprising a ball movable relative to and carried by said piston, resilient means urging said ball toward said operating rod and an annular groove in said part of said rod for said ball to coact with when said part registers with said piston.

3. In an oil gun structure, an oil cylinder, a piston element reciprocable therein, an operating element slidable through said piston element, a clutch member carried by and movable relative to one of said elements, spring means urging said clutch member toward the other of said elements, a groove in said other element with which said clutch member may coact when said groove registers therewith, said clutch member being disengageable from said groove against the action of said spring means when there is oil in said cylinder resisting the movement of said piston and said operating element is forced to slide relative to said piston.

4. In an oil gun structure, an oil cylinder, a piston element reciprocable therein, an operating element slidable through said piston element, a clutch member carried by and movable relative to one of said elements, spring means urging said clutch member toward the other of said elements, a groove in said other element with which said clutch member may coact when said groove registers therewith, and a shut off nozzle connected with said cylinder said shut off nozzle, when closed, confining said piston against movement relative to said cylinder when said operating element is pushed inwardly.

IVAN L. EASTMAN.